United States Patent [19]
Houlihan

[11] 3,898,275
[45] Aug. 5, 1975

[54] M-SUBSTITUTED BENZOPHENONES

[75] Inventor: William J. Houlihan, Mountain Lakes, N.J.

[73] Assignee: Sandoz, Inc., E. Hanover, N.J.

[22] Filed: Dec. 14, 1973

[21] Appl. No.: 424,544

Related U.S. Application Data

[63] Continuation of Ser. No. 91,546, Nov. 20, 1970, abandoned.

[52] U.S. Cl. ................. 260/517; 71/70; 71/72; 71/75; 71/88; 71/98; 71/113; 71/123; 260/340.5; 260/340.9; 260/516; 260/591; 260/599; 260/607 A; 424/278; 424/282; 424/317; 424/331; 424/334; 424/337
[51] Int. Cl. ............................................ C07c 65/20
[58] Field of Search ................................... 260/517

[56] References Cited
OTHER PUBLICATIONS
Chardonnens et al., Chemical Abstracts, Vol. 53 (1959) 13125i.

Kränzlein et al., Chemical Abstracts, Vol. 28, (1934) 10571.

*Primary Examiner*—Anton H. Sutto
*Assistant Examiner*—Richard L. Raymond
*Attorney, Agent, or Firm*—Gerald D. Sharkin; Robert S. Honor; Thomas O. McGovern

[57] ABSTRACT m-Substituted dihalo benzophenones and dihalo diphenylsulfones, e.g., 2,4 or 2,6-dichloro-3-benzoylbenzoic acid or 2,4-dichloro-m-tolylphenylsulfone, are prepared from m-substituted phenyllithium intermediates and are useful as adjuvant arthritis agents or plant growth regulators.

6 Claims, No Drawings

M-SUBSTITUTED BENZOPHENONES

This is a continuation of application Ser. No. 91,546, filed Nov. 20, 1970, now abandoned.

This invention relates to dihalo benzophenones and dihalo diphenylsulfones. In particular, the invention relates to m-substituted derivatives of dihalobenzophenones and dihalodiphenylsulfones, processes for their preparation and their use in the treatment of adjuvant arthritis or as plant growth regulators.

The compounds of this invention may be represented by the following formula:

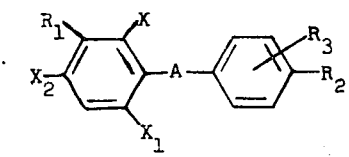

(I)

where
A represents

or —SO$_2$—;
X represents halo having an atomic weight of about 19 to 36;
X$_1$ and X$_2$ each independently represents hydrogen or halo having an atomic weight of about 19 to 36;
R$_1$ represents lower alkyl, i.e., alkyl having one to four carbon atoms, e.g., methyl, ethyl, isopropyl and the like, —CHO, —COOH or

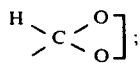

and
R$_2$ and R$_3$ each independently represent hydrogen, halo having an atomic weight of about 19 to 36, lower alkoxy, i.e., straight chain lower alkoxy having one to four carbon atoms, e.g., methoxy, ethoxy, propoxy and the like, or
R$_2$ and R$_3$ together on adjacent carbon atoms represent methylenedioxy, provided that either X$_1$ or X$_2$ but not both is hydrogen and that when X$_1$ is hydrogen, A is >C=O and R$_1$ is —COOH.

The compounds of formula (I) in which R$_1$ is lower alkyl or

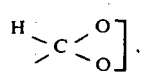

X$_1$ is halo having an atomic weight of about 19 to 36, and X$_2$ is hydrogen are prepared in accordance with the following reaction scheme:

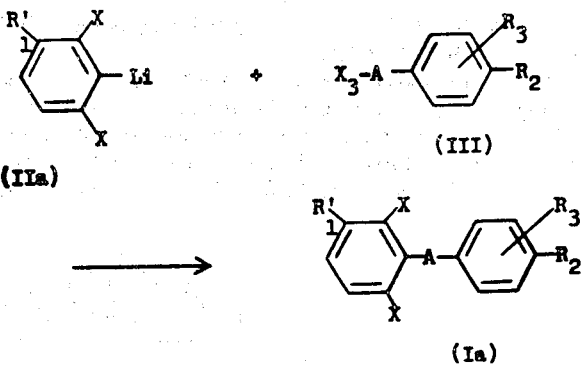

where
A, X, R$_2$ and R$_3$ are as defined above;
R$_1$' represents lower alkyl as defined above or

and
X$_3$ is halo having an atomic weight between about 19 to 80 provided that when A is —SO$_2$—, X$_3$ is fluoro.

The compounds of formula (Ia) are prepared by treating a lithium intermediate (IIa) with a compound of formula (III) in an inert solvent at a temperature of from about −50° C. to about −10° C. The preferred temperature is −50° C. to −25° C. The inert solvent may be a lower hydrocarbon preferably pentane, hexane, heptane and the like, ethers preferably diethyl ether, dibutyl ether and the like, or tetrahydrofuran and benzene. Tetrahydrofuran and hexane are especially preferred. The particular solvent used and the temperature at which the reaction is run are not critical. The final product is recovered by conventional techniques, e.g., by evaporation.

The compounds of formula (Ia) in which R$_1$' is

are converted to the corresponding aldehydes or vice versa, by known techniques, i.e., by treating the acetals with a mineral acid or the aldehydes with ethylene glycol.

The compounds of formula (I) in which X$_1$ is halo having an atomic weight of about 19 to 36, X$_2$ is hydrogen and R$_1$ is —COOH are prepared in accordance with the following reaction scheme:

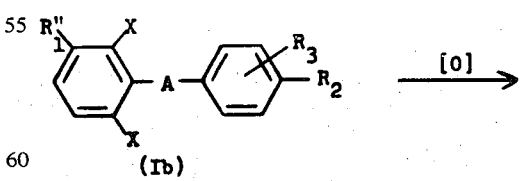

where A, X, $R_2$ and $R_3$ are as previously defined and $R_1''$ is —$CH_3$ or —CHO.

The compounds of formula (Ic) are prepared by oxidizing a compound of formula (Ib) in an inert solvent. Although the particular solvent is not critical, water plus a water soluble cyclic ether such as tetrahydrofuran or dioxane is preferred. The temperature at which the reaction is run is not critical; but it is preferred that the reaction be run at temperatures between about 25° to 50° C., especially between about 25° to 35° C. The oxidizing reagent used can be any of the conventional oxidizing agents, although potassium permanganate is preferred. The product (Ic) is recovered by conventional techniques, e.g., evaporation and recrystallization.

The compounds of formula (I) in which $X_1$ is hydrogen, $X_2$ is halo having an atomic weight of about 19 to 36, A is >C=O and $R_1$ is —COOH are prepared in accordance with the following flow diagram:

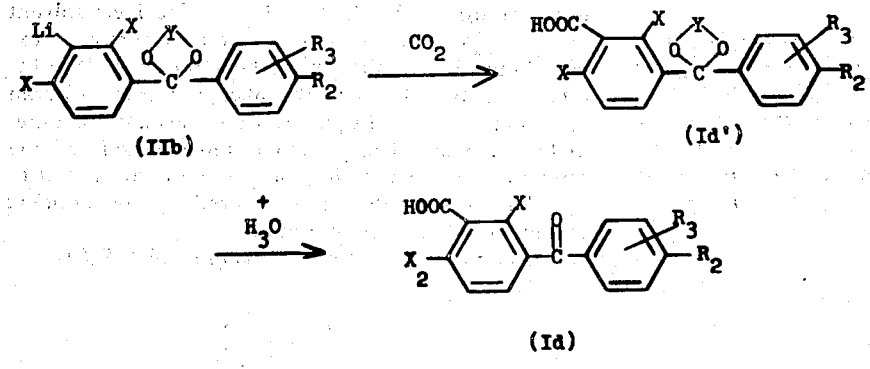

where
X, $R_2$ and $R_3$ are as defined previously, and
Y represents —$(CH_2)_n$— or

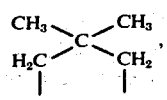

and
n is 2 or 3.

The compounds of formula (Id) are prepared by treating a lithium intermediate (IIb) with carbon dioxide in an inert solvent at a temperature of from about —50° C. to about —10° C. and thereafter hydrolyzing the intermediate (Id') with acid. The preferred temperature is —50° C. to —25° C. The carbon dioxide used can be a solid or gas. The solvent may be a lower hydrocarbon, preferably pentane, hexane, heptane and the like, ethers, preferably diethyl ether, dibutyl ether and the like, tetrahydrofuran and benzene. Tetrahydrofuran and hexane are especially preferred. The particular solvent used and the temperature at which the reaction is carried out are not critical. The intermediates of formula (Id') are converted to the corresponding ketones of formula (Id) by hydrolyzing with an acid. The final product is recovered by conventional techniques, e.g., extraction and evaporation.

The present invention also encompasses the lithium derivatives (IIb) which are prepared in accordance with the following reaction scheme:

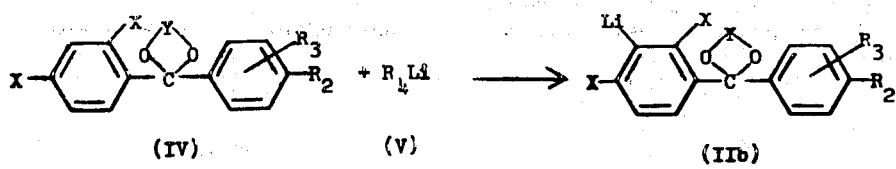

where
X, Y, $R_2$ and $R_3$ are defined above, and
$R_4$ represents straight chain alkyl having one to eight carbon atoms.

The lithium intermediates (IIb) are prepared by reacting at a temperature between about —60° C. to —30° C., preferably between about —50° C. to —40° C., a compound of formula (IV) with a straight chain alkyl lithium compound (V) in an inert solvent in the presence of an inert gas. The preferred alkyl lithium compound is butyl lithium. The preferred solvents are the lower hydrocarbons such as pentane, hexane, heptane and the like, ethers such as diethyl ether, dibutyl ether, and the like, tetrahydrofuran and benzene and especially tetrahydrofuran. The inert gas may be nitrogen, helium, argon and the like.

The compounds of formula (IV) are known or can be prepared by treating the corresponding ketones of the formula

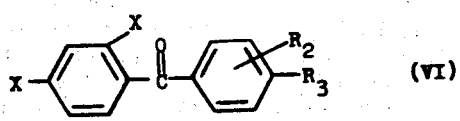

where X, $R_2$ and $R_3$ are as previously defined with an appropriate glycol using known techniques.

The compounds of formula (V) and many of the compounds of formulas (III) and (VI) are known and are prepared by methods described in the literature. The compounds of formulas (III) and (VI) which are not specifically described in the literature may be prepared by analogous methods from known materials.

The compounds of formula (I) in which $R_1$ is lower alkyl are useful because they possess pharmacological activity in animals. In particular, these compounds are useful as anti-inflammatory agents, as indicated by their activity in rats given 25 milligrams per kilogram of animal body weight of active ingredients and tested substantially in accordance with the procedure described by Perrine, J. W. and Takesue, E. I. (Arch. Int. Pharmacodyn., 174 : 192, 1968).

For such use, the compounds may be admixed with conventional pharmaceutical carriers or diluents and administered internally (orally or parenterally) in the form of tablets, capsules, elixirs, solutions, or suspensions. The dosage administered will, of course, vary depending upon the compound employed, mode of administration and treatment desired. However, in general, satisfactory results are obtained when the compound is administered at a daily dosage of from about 5 milligrams per kilogram of body weight to about 500 milligrams per kilogram of body weight, preferably given in divided doses two to four times a day or in sustained release form. For the larger mammals the total daily dosage is generally from about 10 milligrams to about 1,000 milligrams, and dosage forms suitable for internal administration comprise from about 2.5 milligrams to about 500 milligrams of the compound admixed with a solid or liquid pharmaceutical carrier or diluent.

The preferred pharmaceutical compositions from the standpoint of preparation and ease of administration are solid compositions, particularly hard-filled capsules and tablets containing from about 100 milligrams to about 500 milligrams of the active ingredient.

A representative formulation suitable for oral administration is a capsule prepared by standard encapsulating techniques which contain the following ingredients:

| Ingredients | Weight (mg.) |
| --- | --- |
| 2,6-dichloro-m-tolylphenylsulfone | 100 |
| Inert solid diluent (starch, lactose, kaolin, etc.) | 200 |

The compounds of formula (I) in which $R_1$ is —CHO or —COOH and agriculturally acceptable salts of the compounds in which $R_1$ is —COOH, e.g., the sodium and potassium salts thereof, are useful as plant growth regulators.

It is to be understood that the term "plant growth regulator" property of a compound or composition as used herein means a property thereof which affects some growth function of a plant treated therewith, e.g., cell elongation, shoot growth, root growth, dormancy, flowering, leaf abscission, fruit thinning and fruit fall. The term does not extend to any herbicidal properties, i.e., properties which result in the destruction of the plant treated.

The compounds of formula (I) in which $R_1$ is —CHO or —COOH and the agriculturally acceptable salts of the compound in which $R_1$ is —COOH may be employed as pre-emergence or post-emergence plant growth regulators. For this purpose, they are employed in association with an agriculturally acceptable carrier or diluent. The said compounds may be applied to a desired locus by spraying, watering or dusting. Conventional applicator equipment may be employed. The preferred method of application is spraying the said compounds either in suspension or solution. Formulations adapted for spraying containing the said compounds may include spraying agents, e.g., wettable powders, water dispersible concentrates, oil dispersions or emulsified concentrates, which after dilution if necessary may be applied to the plant or locus to be treated.

Generally, formulations may contain between 10% and 95% by weight of the said compounds, preferably between 50% and 85% by weight. Application forms of the formulations contain generally between 0.0001 and 1% by weight of the said compounds, although naturally, the plant growth regulating effective dose to be employed will vary depending on such general factors as the desired effect, the age of the plants, the culture medium, ambient temperature, humidity and light.

Methods employed to determine the plant growth regulator activity are as follows:

Test Method A: Cell elongation

Plant: Cucumis sativus L

Cucumber seeds are pregerminated at approximately 25°C. in Molisch dishes on moist filter paper in the dark. After 4 days seedlings whose hypocotyls are 6 to 7 cm in length are selected. Hypocotyl segments are prepared by cutting the hypocotyls with a razor blade 3.0 cm below the base of the cotyledons. Cotyledons are removed or left attached to the segments. Sets of 10 hypocotyl segments are incubated at 25°C. in the dark in covered dishes each containing 50 cc of test solution.

The test solutions employed (Knop nutrient solutions diluted with water to one-fifth contain the test compounds in concentrations of 100, 10, 1 and 0.1 p.p.m. After 48 hours the length of the hypocotyls are measured and compared with control plants. All manipulations except the length measurements are carried out in red light in a dark room.

Test Method B: Germination rate, shoot and root growth (cell elongation and cell division)

Plant: Avena sativa L

Oat seeds are placed on a wire gauze having a mesh of appropriate size. The gauze touches the surface of a Knop nutrient solution in a beaker, the solution containing the test compounds in concentrations of 10, 1 and 0.1 p.p.m. Fifteen seeds are used per beaker. The germination rate is determined and the longitudinal growth of the shoots as well as of the roots and other growth effects (e.g., curvatures) are evaluated visually in comparison with control plants.

Test Method C: Leaf abscission (Defoliation)

Plant: Phaseolus vulgaris L

Explants are prepared from 3 week old bean plants (cultivation carried out in a mixture of peat medium substrate and sand). The explants consist of the petiole stumps of the primary leaves and a part of the epicotyl attached. The compounds to be tested are mixed in concentrations of 1000, 100 and 10 p.p.m. with 0.1% warm agar. 5 microliters of the still warm mixture are applied on the cut surface of the petioles with a syringe. The number of petioles that abscise after application of constant pressure is recorded daily and compared with the number of petioles abscised of the control plants (pure 0.1% agar.).

EXAMPLE 1

2,6-Dichloro-m-tolylphenylsulfone

Into a flask equipped with a stirrer dropping funnel, carbon dioxide condenser and gas inlet tube are charged 17.7 g. (0.11 mole) of 2,4-dichlorotoluene and 200 ml. of anhydrous tetrahydrofuran. The system is flushed with dry nitrogen and cooled in a dry ice-acetone bath to an internal temperature of —50°C. An 85 ml. solution of 157. n-butyllithium (0.136 mole) in hexane is added dropwise while maintaining the temperature at —50°C. A solution of 23.2 g. (0.132 mole) of benzenesulfonyl fluoride in 50 ml. dry tetrahydrofuran is then added dropwise over a period of 25 minutes. The dry ice bath is removed and the mixture allowed to stir for about 18 hours after which it is treated with 30 ml. of saturated ammonium chloride solution and about 50 g. anhydrous sodium sulfate. The salts are filtered off and the filtrate concentrated in vacuo to give 2,6-dichloro-m-tolylphenylsulfone, m.p. 130°–132° (recrystallized from methanol).

Following the above procedure, but using an equivalent amount of p-chlorobenzenesulfonyl fluoride; 3,4-dichlorobenzenesulfonyl fluoride; p-methoxybenzenesulfonyl fluoride or 3,4-methylenedioxybenzenesulfonyl fluoride in place of the benzene sulfonyl fluoride used therein there is obtained 4-chlorophenyl-2,6-dichloro-m-tolylsulfone, 3,4-dichlorophenyl-2,6-dichloro-m-tolylsulfone, 4-methoxyphenyl-2,6-dichloro-m-tolylsulfone or 3,4-methylenedioxyphenyl-2,6-dichloro-m-tolylsulfone, respectively.

EXAMPLE 2

2,6-dichloro-3-benzoylbenzoic acid

The aryllithium compound, 5,5-dimethyl-2-phenyl-2-(2,4-dichloro-3-lithio-phenyl)-1,3-dioxane, obtained from 18.5 g (0.055 mole) of 5,5-dimethyl-2-phenyl-2-(2,4-dichlorophenyl)-1,3-dioxane; 200 ml tetrahydrofuran and 41.3 ml (0.066 mole) n-butyllithium prepared as in Example 1 is poured onto about 200 g of crushed dry ice and then allowed to stand about 15 hours at room temperature. The solvent is removed in vacuo and the residue is treated with 150 ml 2N sodium hydroxide and 75 ml of benzene. The water layer is separated and treated with 2N HCl until acidic to litmus paper. The resultant precipitate, 5,5-dimethyl-2-phenyl-2-(3-carboxy-2,4-dichlorophenyl)-1,3-dioxane, is separated and refluxed with 150 ml 2N HCl for 24 hours. The acidic solution is extracted with 150 ml methylene chloride, dried with Na$_2$SO$_4$, filtered and concentrated in vacuo to give 2,6-dichloro-3-benzoylbenzoic acid, m.p. 146° – 150° (recrystallized from isopropanol-pentane).

When an equivalent amount of 5,5-dimethyl-2-(p-chlorophenyl)-2-(2,4-dichlorophenyl)-1,3-dioxane; 5,-5-dimethyl-2-(3,4-dichlorophenyl)-2-(2,4-dichlorophenyl)-1,3-dioxane; 5,5-dimethyl-2-(p-methoxyphenyl)-2-(2,4-dichlorophenyl)-1,3-dioxane or 5,5-dimethyl-2-(3,4-methylenedioxyphenyl)-2-(2,4-dichlorophenyl)-1,3-dioxane is used in place of 5,5-dimethyl-2-phenyl-2-(2,4-dichlorophenyl)-1,3-dioxane in the above process, there is obtained before carboxylation with the dry ice 5,5-dimethyl-2-(p-chlorophenyl)-2-(2,4-dichloro-3-lithiophenyl)-1,3-dioxane; 5,5-dimethyl-2-(3,4-dichlorophenyl)-2-(2,4-dichloro-3-lithiophenyl)-1,3-dioxane; 5,5-dimethyl-2-(p-methoxyphenyl)-2-(2,4-dichloro-3-lithiophenyl)-1,3-dioxane or 5,5-dimethyl-2-(3,4-methylenedioxyphenyl)-2-(2,4-dichloro-3-lithiophenyl)-1,3-dioxane, respectively; and after carboxylation with the dry ice, 5,5-dimethyl-2-(p-chlorophenyl)-2-(3-carboxy-2,4-dichlorophenyl)-1,3-dioxane; 5,5-dimethyl-2-(3,4-dichlorophenyl)-2-(3-carboxy-2,4-dichlorophenyl)-1,3-dioxane; 5,5-dimethyl-2-(p-methoxyphenyl)-2-(3-carboxy-2,4-dichlorophenyl)-1,3-dioxane or 5,5-dimethyl-2-(3,4-methylenedioxyphenyl)-2-(3-carboxy-2,4-dichlorophenyl)-1,3-dioxane, respectively.

When each of the foregoing acids is refluxed with acid in accordance with the procedure of this example, there is obtained 2,6-dichloro-3-(p-chlorobenzoyl)benzoic acid; 2,6-dichloro-3-(3,4-dichlorobenzoyl)benzoic acid; 2,6-dichloro-3-(p-methoxybenzoyl)benzoic acid or 2,6-dichloro-3-(3,4-methylenedioxybenzoyl)benzoic acid, respectively.

EXAMPLE 3

2,6-dichloro-3-methylbenzophenone

The aryllithium compound obtained from 54.8 g (0.34 mole) of 2,4-dichlorotoluene, 350 ml of tetrahydrofuran and 225 ml (0.36 mole) of 15% n-butyllithium in hexane prepared in accordance with the procedure of Example I is treated at —50° with a solution of 70 g (0.50 mole) benzoyl chloride in 75 ml tetrahydrofuran.

The mixture is stirred at room temperature for about 18 hours and then treated with 150 ml saturated NH$_4$Cl and about 100 g anhydrous Na$_2$SO$_4$.

The salts are filtered off and the filtrate concentrated in vacuo to give 2,6-dichloro-3-methylbenzophenone, m.p. 93° – 94° (recrystallized from pentane-benzene).

Following the above procedure but using an equivalent amount of p-chlorobenzoyl chloride; 3,4-dichlorobenzoyl chloride; p-methoxy-benzoyl chloride or 3,4-methylenedioxybenzoyl chloride in place of the benzoyl chloride used therein, there is obtained 2,6-dichloro-m-tolyl-p-chlorophenone; 2,6-dichloro-m-tolyl-3',4'-dichlorophenone; 2,6-dichloro-m-tolyl-p-methoxyphenone or 2,6-dichloro-m-tolyl-3',4'-methylenedioxyphenone, respectively.

EXAMPLE 4

2,4-dichloro-3-benzoylbenzaldehyde

The aryllithium compound obtained from 74.4 g (0.34 mole) of 2-(2,4-dichlorophenyl)-1,3-dioxolane, 400 ml of tetrahydrofuran and 255 ml (0.408 mole) of 15% n-butyllithium in hexane prepared according to the process of Example 1 is treated at —50° with a solution of 71.9 g (0.51 mole) benzoyl chloride in 100 ml tetrahydrofuran and then stirred at room temperature for about 18 hours. The mixture is treated with about 75 ml saturated NH$_4$Cl and about 75g anhydrous Na$_2$SO$_4$.

The salts are filtered off and the filtrate concentrated in vacuo. The residue 2-(2,4-dichloro-3-benzoyl)phenyl-1,3-dioxolane is hydrolyzed with 150 ml 2N HCl for 16 hours at room temperature and 4 hours at 60°. The acid mixture is extracted with CHCl$_3$ and the organic layer is dried with MgSO$_4$, filtered and concentrated in vacuo to give 2,4-dichloro-3-benzoylbenzaldehyde, m.p. 93°–95°C. (recrystallized from ether-pentane).

Following the above procedure but using an equivalent amount of p-chlorobenzoylchloride; 3,4-dichlorobenzoyl chloride; p-methoxybenzoyl chloride or 3,4-methylenedioxybenzoyl chloride in place of the benzoyl chloride used therein, there is obtained 2-(2,4-dichloro-3-[p-chlorobenzoyl]) phenyl -1,3-dioxolane; 2-(2,4-dichloro-3-[3,4-dichlorobenzoyl])phenyl -1,3- dioxolane; 2-(2,4-dichloro-3-[p-methoxybenzoyl])-phenyl -1,3-dioxolane or 2-(2,4-dichloro-3-[3,4-methylenedioxybenzoyl])phenyl -1,3-dioxolane, respectively before hydrolysis and 2,4-dichloro-3-[p-chlorobenzoyl]benzaldehyde; 2,4-dichloro-3-[3,4-dichlorobenzoyl]benzaldehyde; 2,4-dichloro-3-[p-methoxybenzoyl]benzaldehyde or 2,4-dichloro-3-[3,4-methylenedioxybenzoyl]-benzaldehyde, respectively after hydrolysis.

EXAMPLE 5

2,4-dichloro-3-benzenesulfonylbenzaldehyde

Following the procedure of Example 4 but using an equivalent amount of benzenesulfonyl fluoride; p-chlorobenzenesulfonyl fluoride; 3,4-dichlorobenzenesulfonyl fluoride; p-methoxybenzenesulfonyl fluoride or 3,4-methylenedioxybenzenesulfonyl fluoride in place of the benzoyl chloride used therein, there is obtained 2-(2,4-dichloro-3-benzenesulfonyl)phenyl-1,3-dioxolane; 2-(2,4-dichloro-3-[p-chlorobenzenesulfonyl])phenyl-1,3-dioxolane; 2-(2,4-dichloro-3-[3,4-dichlorobenzenesulfonyl])phenyl-1,3-dioxolane; 2-(2,4-dichloro-3-[p-methoxybenzenesulfonyl])phenyl-1,3-dioxolane or 2-(2,4-dichloro-3-[3,4-methylenedioxybenzenesulfonyl])phenyl-1,3-dioxolane, respectively before hydrolysis and 2,4-dichloro-3-benzenesulfonylbenzaldehyde; 2,4-dichloro-3-(p-chlorobenzenesulfonyl)benzaldehyde; 2,4-dichloro-3-(3,4-dichlorobenzenesulfonyl)benzaldehyde; 2,4-dichloro-3-(p-methoxybenzenesulfonyl)benzaldehyde or 2,4-dichloro-3-(3,4-methylenedioxybenzenesulfonyl)benzaldehyde, respectively after hydrolysis.

EXAMPLE 6

2,4-dichloro-3-benzoylbenzoic acid

A stirred solution of 5.56 g (0.02 mole) of 2,4-dichloro-3-benzoyl benzaldehyde in 50 ml of dioxane prepared in accordance with the procedure of Example 4 is treated dropwise with a solution of 4.42 g (0.028 mole) potassium permanganate in 88 ml water at such a rate that the internal temperature does not exceed 35°C. The mixture is stirred an additional 18 hours at room temperature and the resultant salts are filtered off. The filtrate is made acidic with 2N HCL and then concentrated in vacuo. The resultant solid is treated with 25 ml of water, filtered and washed with 25 ml of water to give 2,4-dichloro-3-benzoylbenzoic acid, m.p. 171°–173° (recrystallized from isopropanol).

When an equivalent amount of 2,4-dichloro-3-[p-chlorobenzoyl]-benzaldehyde; 2,4-dichloro-3-[3,4-dichlorobenzoyl]benzaldehyde; 2,4-dichloro-3-[p-methoxybenzoyl]benzaldehyde; 2,4-dichloro-3-[3,4-methylenedioxybenzoyl]-benzaldehyde; 2,6-dichloro-m-tolylphenylsulfone; 2,4-dichloro-3-(p-chlorobenzenesulfonyl)benzaldehyde; 2,4-dichloro-3-(3,4-dichlorobenzenesulfonyl)-benzaldehyde; 2,4-dichloro-3-(p-methoxybenzenesulfonyl)benzaldehyde or 2,4-dichloro-3-(3,4-methylenedioxybenzenesulfonyl)benzaldehyde is used in place of 2,4-dichloro-3-benzoylbenzaldehyde in the above process, there is obtained 2,4-dichloro-3-[p-chlorobenzoyl]benzoic acid; 2,4-dichloro-3-[3,4-dichlorobenzoyl]benzoic acid; 2,4-dichloro-3-[p-methoxybenzoyl]benzoic acid; 2,4-dichloro-3-[3,4-methylenedioxybenzoyl]benzoic acid; 2,4-dichloro-3-benzenesulfonyl benzoic acid; 2,4-dichloro-3-(p-chlorobenzenesulfonyl)benzoic acid; 2,-4-dichloro-3-(3,4-dichlorobenzenesulfonyl)benzoic acid; 2,4-dichloro-3-(p-methoxybenzenesulfonyl)benzoic acid or 2,4-dichloro-3-(3,4-methylenedioxybenzenesulfonyl)benzoic acid, respectively.

What is claimed is:

1. A compound of the formula:

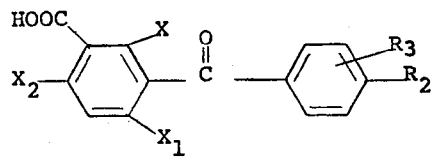

where
X is halo having an atomic weight of 19 to 36
$X_1$ and $X_2$ each independently represents hydrogen or halo having an atomic weight of 19 to 36, and
$R_2$ and $R_3$ each independently represent hydrogen, halo having an atomic weight of 19 to 36 or lower alkoxy
provided that only one of $X_1$ or $X_2$ is hydrogen.

2. The compound of claim 1 which is 2,6-dichloro-3-benzoylbenzoic acid.

3. The compound of claim 1 which is 2,4-dichloro-3-benzoylbenzoic acid.

4. The compound according to claim 1, which is 2,4-dichloro-3-[p-chlorobenzoyl]benzoic acid.

5. The compound according to claim 1, which is 2,4-dichloro-3-[3,4-dichlorobenzoyl]benzoic acid.

6. The compound according to claim 1, which is 2,4-dichloro-3-[p-methoxybenzoyl]benzoic acid.

* * * * *